United States Patent [19]

Janoski

[11] Patent Number: 5,319,008
[45] Date of Patent: * Jun. 7, 1994

[54] SUBSTANTIALLY SOLVENT-FREE, STABLE DISPERSION OF A BITUMINOUS MATERIAL IN A LIQUID PREPOLYMER, AND METHOD FOR FORMING THE DISPERSION

[75] Inventor: Ronald J. Janoski, Chagrin Falls, Ohio

[73] Assignee: Tremco, Inc., Beachwood, Ohio

[ * ] Notice: The portion of the term of this patent subsequent to Apr. 16, 2008 has been disclaimed.

[21] Appl. No.: 858,453

[22] Filed: Mar. 27, 1992

Related U.S. Application Data

[63] Continuation-in-part of Ser. No. 497,048, Mar. 21, 1990, abandoned.

[51] Int. Cl.$^5$ ............................................ C08L 95/00
[52] U.S. Cl. ....................................... 524/59; 524/64; 524/70; 524/284; 524/589; 524/590; 524/705; 524/848; 524/871; 525/127; 252/182.14; 252/182.18; 252/182.2; 252/182.22; 106/277
[58] Field of Search ................ 524/59, 705, 589, 590, 524/871, 848, 284, 64, 70; 525/127; 252/182.2, 182.22, 182.14, 182.18; 106/277

[56] References Cited

U.S. PATENT DOCUMENTS

| | | | |
|---|---|---|---|
| 3,179,610 | 4/1965 | Wood | 524/705 |
| 3,637,558 | 1/1972 | Verdol et al. | 524/705 |
| 3,909,474 | 9/1975 | Borchert et al. | 106/277 |
| 4,018,730 | 4/1977 | McDonald | 106/277 |
| 4,137,204 | 1/1979 | McDonald | 106/277 |
| 4,412,864 | 11/1983 | Kurashige et al. | 524/59 |
| 4,724,245 | 2/1988 | Lalanne et al. | 525/54.5 |
| 4,795,760 | 1/1989 | Lucke | 524/59 |
| 4,871,792 | 10/1989 | Lucke | 524/59 |
| 4,970,025 | 11/1990 | Demangeon et al. | 106/277 |
| 5,008,311 | 4/1991 | Janoski | 524/705 |
| 5,045,590 | 9/1991 | Motomura et al. | 524/705 |

FOREIGN PATENT DOCUMENTS

| | | | |
|---|---|---|---|
| 720855 | 11/1965 | Canada | 524/59 |
| 587725 | 1/1980 | U.S.S.R. | 524/705 |

OTHER PUBLICATIONS

Grant et al.; *Grant and Hackh's Chemical Dictionary, Fifth Edition;* McGraw-Hill Book Company; New York; 1987; pp. 454 and 575.

Primary Examiner—John Kight, III
Assistant Examiner—Rabon Sergent
Attorney, Agent, or Firm—Alfred D. Lobo; David P. Dureska

[57] ABSTRACT

A moisture-curable, substantially solvent-free and anhydrous blend of a bituminous material such as asphalt and a liquid prepolymer is disclosed, which blend when cured, results in an elastomer having excellent adhesion to surfaces exposed outdoors. The stability of the blend derives from asphalt being microdispersed in a dispersed phase within a continuous phase of the liquid prepolymer so that particles of asphalt are in the size range from 0.5 μm to 100 μm. The asphalt is treated to react all functional groups it may have because they may react with a functional group of the liquid prepolymer. The prepolymer is a polyurethane, a terpolymer of ethylene-propylene-diene, or a silicone. The microdispersion is stably maintained by a compatibilizer having opposed substantially polar and non-polar terminal portions, present in an amount in the range from 0.01 to 5 parts per 100 parts of the blend. The compatibilizer is chosen from (A) an ester of a $C_2$–$C_{12}$ branched or straight chain polyol; (C) a mono- or diester of a polyether polyol; (D) an ester of a polyester polyol and a $C_9$–$C_{24}$ fatty acid; (E) an ester of a polyether diol such as a polyalka($C_5$–$C_6$)diene diol and, a polydimethylsiloxane diol; or, (F) an ester of a polyester polyol having a repeating unit derived from acrylic acid and a polyol selected from the group consisting of a $C_2$–$C_{12}$ alkylene diol, or triol; a polyalkylene $C_2$–$C_4$ diol; and a polyoxyalkylene $C_2$–$C_4$ diol.

19 Claims, No Drawings

SUBSTANTIALLY SOLVENT-FREE, STABLE DISPERSION OF A BITUMINOUS MATERIAL IN A LIQUID PREPOLYMER, AND METHOD FOR FORMING THE DISPERSION

CROSS-REFERENCE TO RELATED APPLICATION

This application is a continuation-in-part application of Ser. No. 07/497,048 filed Mar. 21, 1990, now abandoned.

BACKGROUND OF THE INVENTION

The present invention relates to curable, substantially solvent-free materials, particularly prepolymer curing systems in combination with a bituminous material. More specifically, the present invention is directed to the use of a compatibilizer to disperse the bituminous material into a liquid prepolymer system so as to form a stable dispersion, without using a solvent such as an aliphatic or aromatic liquid commonly used to dissolve asphalt and form a miscible blend with the liquid prepolymer. The goal was to form a solvent-free, stable dispersion of the bituminous material in the prepolymer which upon being cured, preferably at ambient conditions, would result in an adhesive elastomer useful as a coating, adhesive, sealant, caulk, or similar material.

By "bituminous material" is meant bitumen or asphalt. Tars and pitches are not covered by the present invention. Tars are obtained from the thermal decomposition of natural organic substances. Pitches are the residue of tar distillation. Bitumens are complex mixtures comprising polycyclic hydrocarbons and oxygen-containing acyclic and heterocyclic compounds. Bitumens are the dark, solid or semi-solid, high molecular weight hydrocarbons obtained from processing crude oil and the natural asphalt fraction soluble in carbon disulfide. Asphalt is a dark, cementitious material having a solid or semi-solid consistency, which occurs naturally or as a petroleum derivative. Asphalts are generally mixtures of bitumens and mineral substances.

For ease and convenience, since bitumens and asphalts., are both used in the dispersions of this invention, and because of their similar behavior herein, the term "asphalt" will be used hereafter to refer to both asphalts and bitumens.

Because asphalt is inexpensive, has a relatively high penetration value when applied to most porous surfaces, and is relatively weather-resistant and water-impermeable, it has traditionally been used as a main component of protective films, adhesives, binders, etc. Asphalt in blends or emulsions, are used in large quantities for a wide array of products used in paving and roofing; for joint sealants, specialty paints, electrical laminates and hot melt adhesives; as diluents in the manufacture of low-grade rubber products, as diluents for the disposal of radioactive waste; for hot-dip coatings, and for water-retention barriers. Many such blends or emulsions are formulated with a curable liquid prepolymer, to be spread at ambient conditions, and to cure after they are spread, into a rubbery mass.

However, the spreadability of such blends generally derives from their being diluted with a volatile solvent, which is a common solvent for the bituminous material as well as for the prepolymer. Such solvents used have been toluene, aromatic oils, naphtha, mineral spirits or carbon disulfide. Though the amount of a solvent used may only provide partial solubility of the asphalt, the effect of the solvent is to suspend the base material forming a dispersion. After mixing, the dispersion can be easily applied by conventional technology so that, after the solvent evaporates, the asphalt is left intermixed with the other constituents.

As long as more than 25 years ago, an effort to avoid using a solvent in a blend of a polyurethane prepolymer and asphalt was disclosed in U.S. Pat. No. 3,179,610 to Wood, but because of the problem of maintaining a stable dispersion he mixed the components and immediately used them to bind an aggregate such as is used in road paving. He then cured and tested the cured aggregate-binder mixture for stability.

The problem of incorporating a bituminous material in a polyurethane prepolymer was solved in a method disclosed in U.S. Pat. No. 4,871,792 to Lucke who used a combination of a primary plasticizer, namely butylurethane-formaldehyde-carbamic acid ester resin, and a secondary plasticizer, namely 1-methyl-2,3-dibenzyl-benzene (2,3-dibenzyl toluene), to provide the requisite solubility of the bitumen in the prepolymer. As he states, his goal was to produce a "onecomponent", that is, single phase, system. This solution to the problem is quite different from the one set forth in this specification which teaches producing a stable dispersion of a bituminous material ("asphalt") which is maintained as a separate phase because it is not soluble in the prepolymer phase.

Thus, though there have been numerous attempts to provide a blend of a liquid, preferably ambient-curable prepolymer, with asphalt, the critical importance of maintaining the asphalt as the dispersed phase in a continuous phase of a polyurethane prepolymer was recognized only in my U.S. Pat. No. 5,008,311 but I was unaware of the importance of the size of dispersed asphalt microglobules or microdroplets (hereafter "particles") to maintain stability. Maintaining a stable dispersion of the asphalt particles in the continuous prepolymer phase is made possible by the use of a compatibilizing agent, or "compatibilizer", having long chains of connected carbon atoms, one end of each chain having, at or near its end, at least one OH group, thought to provide hydrogen bonding with repeating units derived from the ether, ester, isocyanate, siloxane, olefin or diolefin repeating units; the other end of each chain having a high affinity for an asphalt particle. The OH group of the compatibilizer may also react with some of the isocyanate groups on the prepolymer chains, though the extent to which this occurs is not known, and if such a reaction does occur, it will enhance the compatibility of the polar portion of the compatibilizer with the prepolymer.

SUMMARY OF THE INVENTION

It has been discovered that a bituminous material, such as bitumens or asphalts, together referred to herein as "asphalt", can be obtained as a stable dispersion of microscopic asphalt particles ("microdispersion") of discrete particles in a liquid, curable prepolymer if a sufficiently long chain of carbon atoms, the chain having a hydroxyl (OH) group near one of its ends, is used as the compatibilizing agent ("compatibilizer"). The compatibilizer is surprisingly effective to create the microdispersion, present as a disperse phase, in a liquid prepolymer present as the continuous phase.

It is therefore a general object of this invention to provide a stable microdispersion of microscopic asphalt particles in the size range from about 0.5 μm to about 100 μm, more preferably from about 0.5 μm to 44 μm, present as a disperse phase in a continuous phase of liquid prepolymer, the stability of the microdispersion being maintained by the presence of a compatibilizer having at least one OH group near the terminal portion of a $C_9-C_{24}$ chain.

It has more specifically been discovered that a microdispersion of asphalt particles the majority of which are in the size range from about 0.5–44 μm, when dispersed in a continuous phase of liquid prepolymer selected from the group consisting of a polyurethane, an ethylene-propylene-diene (EPDM) terpolymer, and a silicone, may be maintained as a stable dispersion for at least thirty days at a temperature in the range from −20° C. to about 100° C., if the dispersion is stabilized with a compatibilizer selected from the group consisting of an ester of a polyol having from 1 to 40 OH groups, and a $C_9-C_{24}$ fatty acid; and, an ester of malic or citric acid with a long chain alkanol; provided the amount of compatibilizer used is insufficient to dissolve the asphalt.

It is therefore another general object of this invention to provide a stable microdispersion of asphalt in a liquid prepolymer mixed in the presence of a compatibilizer selected from the group consisting of (A) an ester of
(i) a polyol having the formula

$R^1(OH)_{n'}$ wherein $R^1$ represents $C_2-C_{12}$ branched or straight chain hydrocarbyl, and n' is an integer in the range from 2 to 4; and, (ii) a $C_9-C_{24}$ fatty acid, so that at least one OH group remains on the ester formed;

(B) an ester of
(i) a polycarboxylic acid having the formula

$R^2(COOH)_{n''}$ wherein $R^2$ represents $C_4-C_6$; and n" represents 2 or 3; and, (ii) a $C_9-C_{24}$ acyclic alkanol; so that at least one OH group remains on said ester;

(C) a mono- or diester or a polyester polyol or of a polyether polyol having a repeating unit of from $C_3-C_8$ carbon atoms, and a $C_9-C_{24}$ fatty acid;

(D) an ester of a polyester polyol and a $C_9-C_{24}$ fatty acid, said ester having at least one OH group remaining in a terminal portion thereof; (E) an ester of a polyether diol and a $C_2-C_{24}$ fatty acid, said diol being selected from the group consisting of a polyalka($C_5-C_6$)diene diol and, a polydimethylsiloxane diol; and, (F) an ester of a polyester polyol having a repeating unit derived from acrylic acid and a polyol selected from the group consisting of a $C_2-C_{12}$ alkylene diol, or triol; and, a polyalkylene $C_2-C_4$ diol; and a polyoxyalkylene $C_2-C_4$ diol;

with sufficient energy to disperse particles less than 100 μm in diameter within a continuous phase of the prepolymer, and to maintain a dispersion of the particles in the size range over a period of at least 30 days.

It is a specific object of this invention to use the foregoing compatibilizer in an amount greater than 0.01 part per 100 parts by weight of the blend, in a substantially anhydrous stabilized dispersion of the asphalt in the liquid prepolymer, the blend containing from about 25 to 75 parts by weight of prepolymer and the balance being asphalt; and the prepolymer and the asphalt may each be either plasticized to obtain a desirable viscosity, or extended with a phase-extender. By "substantially anhydrous" is meant a moisture content of less than 0.05%, preferably less than 0.02% as measured by a Karl Fischer Coulometric titrator.

In particular, for asphalt, the plasticizer may be chosen with a view to wet and help disperse it in the propolymer phase. The prepolymer phase may be plasticized to improve miscibility of an extender, for example EPDM, to form an interpenetrating network within the continuous phase, or to improve dispersion of a solid inert organic or inorganic filler; and, the asphalt phase may be extended with a nonvolatile hydrocarbon forming a single asphaltic dispersed phase, or with a solid inert organic or inorganic filler.

DETAILED DESCRIPTION OF PREFERRED EMBODIMENTS

The preferred stable dispersion of the present invention is a blend which comprises a liquid prepolymer which is relatively fluid at the temperature at which it is discharged from a container onto the surface on which the blend is to be adhesively deposited; asphalt particles in the size range from about 0.5 μm–44 μm, and the compatibilizer. As much asphalt is used as will permit the blend to meet the storage requirements, and the specifications for the cured blend, because asphalt is inexpensive. The asphalt may be extended with an extender or such components as may enhance the advantageous properties of asphalt, such as high penetration value and/or waterproof and weather resistance properties. The prepolymer component is primarily present to polymerize within the base material subsequent to application, thereby providing a polymer network around the dispersed asphalt phase. The cured prepolymer also provides elastomeric properties which enhance the overall properties of the blend. The compatibilizer maintains the dispersion of the asphalt in the continuous prepolymer phase.

The asphalt preferably used will depend upon the particular application for which a particular temperature range is typically specified. Commercially available asphalts include those derived from (a) residues produced by atmospheric and vacuum distillation of crude petroleum; (b) oxidation or air blowing of asphalts derived from the residues produced in (a); (c) deasphalting of petroleum residues of lubricating oils of asphalt origin; (d) blending hard propane asphalts from (b) with resins and oils to produce the socalled "reconstituted asphalts". Preferred are those produced by (a) which have a rating of 60 Pen - 500 Pen (penetration).

Most preferred are asphalts having relatively few reactive sites, particularly OH groups, since it is essential that substantially all such sites be pre-reacted prior to the use of the asphalt in the blend. The requirement that the blend be essentially anhydrous holds not only for a polyurethane prepolymer but also for a silicone or EPDM continuous phase. Typically the asphalt is substantially free of heterocyclic compounds or compounds which have reactive sites which will react with functional groups on the repeating units of the prepolymer (for example, isocyanates for a polyurethane prepolymer), and the asphalt may be extended with from 1 to 10 parts by weight of an extender, based on 100 parts of blend.

To facilitate mixing, and to produce the high shear required to produce a microdispersion of the asphalt particles, an asphalt having a relatively low softening point, in the range from about 100° F.–350° F., preferably about 100°–200° F., is used. To decrease viscosity, the asphalt and prepolymer each may be plasticized with a thixotropic agent and/or plasticizer conventionally used for the purpose.

Conventional plasticizers which may be used include dibutoxyethyl phthalate ("DBEP"), diisodecyl phthalate ("DIDP"), dibutyl phthalate ("DBP"), butylbenzyl phthalate ("BBP"), dioctyl phthalate ("DOP"), dioctyl sebacate ("DOS"), dioctyl adipate ("DOP") and diethyl butyl sebacate ("DEBS") dibutoxyethoxyethyl sebacate, dibutoxyethyl sebacate, dibutyl sebacate, dioctyl dodecanedioate, diisooctyl dodecanedioate, dioctyl sebacate, dioctyl sebacate (substituted) triisooctyl trimellitate, trioctyl trimellitate, diisooctyl adipate, dioctyl adipate, dioctyl azelate, long chain alkyl alkylether dieSter, dialkyl diether glutarate, dibutoxyethoxyethyl glutarate, dibutoxyethyl glutarate, tributyl phosphated still bottom phosphate plasticizers, and aromatic process oils. Phthalic derivative plasticizers are more preferred, and butylbenzyl phthalate is most preferred. The plasticizer softens the prepolymer and the asphalt making them more fluid and therefore somewhat easier to intermix.

As stated earlier, reactive sites in the asphalt, provided by those functional groups which react with an isocyanate group, are preferably neutralized prior to using the asphalt, or they will likely affect the curing reaction which produces the desired adhesive elastomer. Such reactive groups may include sulfhydryl (—SH) imino (—NH$_2$) substituted amino (—NHR), carbonamide (—CONH$_2$), substituted carbonamide (—CONHR), sulfonamide (—SO$_2$NH$_2$), substituted sulfonamide (—SO$_2$NHR), thioamide (—SHNH$_2$), and sulfonic (—SO$_2$OH) functional groups. Neutralization of such functional groups is effected by treating the asphalt with a blocking agent which provides a blocking group to react with the functional groups. The specific structure of the blocking agent is not narrowly critical as long as the blocking group is readily reactive with the extant functional groups, particularly OH groups, typically present in the asphalt chosen.

An effective blocking agent is a reactive isocyanate (such as a para-toluene-sulfonyl isocyanate or the like), an anhydride of a dicarboxylic acid, or a carbodiimide. Preferred blocking agents include phthalic anhydride, succinic anhydride, or maleic anhydride. The anhydride will generally also react with and remove any water within the base material. The preferred amount of blocking agent to be added to the asphalt is about 0.1 to about 5 parts by weight, the optimal amount added depending upon the particular asphalt used, and the end-use of the blend to be made.

When it is desired to use a polyurethane prepolymer as the liquid, curable prepolymer it is conventionally formed by the reaction of an organic polyisocyanate, preferably a diisocyanate, with a polyol. The —OH group of the polyol reacts with the —NCO group of the diisocyanate, and the resulting addition reaction with hydrogen exchange will link the polyol to the polyisocyanate, creating a urethane linkage.

Because essentially no OH groups are to survive in the prepolymer, an excess of isocyanate groups, in the range from 1 to 50% more than the number of equivalents required, are provided. Preferably, the resulting prepolymer molecules will have from 1 to about 10 unreacted isocyanate functional groups per chain, which isocyanate groups provide reaction sites for curing the prepolymer.

Though triisocyanates and higher polyisocyanates can be used, the preferred polyisocyanates are aromatic diisocyanates such as methylene di-p-phenylene isocyanate ("MDI"), toluene diisocyanate ("TDI"), polymethylene-polyphenylene-diisocyanate, isophorone diisocyanate, and mixtures thereof. Most preferred is MDI.

Suitable polyols include ethylene glycol, propylene glycol, diethylene glycol, polybutadiene polyols, polytetra-hydrofuran polyols, polycarbonate polyols, and caprolactonebased polyols. Such polyols can be reacted with an alkylene oxide including ethylene oxide, propylene oxide and butylene oxide for example, to form polyether polyol adducts useful in forming the polyisocyanate prepolymer. The polyol can have a weight average molecular weight ranging from as low as about 250 to about 10,000 or more.

Preferred prepolymers are polyester and polyether dioldiisocyanate prepolymers prepared by reacting an excess of the diisocyanate with polyethers. Such prepolymers are prepared from polyester polyols such as recycled polyethylene terephthalate polyol having an OH No. in the range from about 100 to 300, and polyether diols such as polyoxypropylene glycol diol having a molecular weight in the range from about 1000 to about 3000. Prepolymers may also be prepared with diols of copolymers of (i) acrylic acid and alkylene and polyalkylene diols, or polyoxyalkylene diols; and (ii) acrylonitrile and dienes, such as of a copolymer of butadiene and acrylonitrile in which copolymer the latter is present in a minor proportion by weight. Polyols of acrylate esters are relatively water sensitive and are not favored.

Depending upon the viscosity of the polyurethane prepolymer it may be desirable to add a plasticizer to facilitate mixing of the components of the dispersion, and to facilitate dispensing the blend from a container, and spreading the blend. A plasticizer may also decrease the temperature sensitivity of the blend, thus extending durability of the blend when used at temperatures greater than about 150° F. Essentially the same plasticizers used to plasticize asphalt may be used.

The amount of prepolymer used in the blend is necessarily at least as much as will provide a continuous phase in which to disperse the asphalt. It will be evident that the smaller the proportion of asphalt, the easier it will be to provide a continuous phase of prepolymer. Since economics dictate that the amount of prepolymer used be minimized for any specific application, the amount of prepolymer used may be as little as about 25 parts by weight per 100 parts of blend, though as much as 90 parts by weight, but more typically, less than 75 parts are used. Most preferably the amount of prepolymer ranges from 25–50 parts by weight.

Suitable compatibilizers have a substantially non-polar terminal portion and a substantially polar terminal portion. The most preferred are chosen in relation to the prepolymer used and the plasticizer, if one is used. Most preferred are those listed herebelow:

(A) esters of (i) a polyol having the formula

$R^1(OH)_{n'}$ wherein $R^1$ represents $C_2$–$C_{12}$ branched or straight chain hydrocarbyl, and n' is an integer in the range from 2 to 4; and, (ii) a $C_9$–$C_{24}$ fatty acid, so that at least one OH group remains on the ester formed. Such esters are formed by the esterification of a straight or branched chain polyol having at least two OH groups, with the fatty acid. For example, esterification of propylene glycol is to leave mainly only one OH group, recognizing that there will be a statistical distribution of relatively few chains in which both OH groups are esterified. Esterification of glycerine is to leave either one or two, preferably two OH groups.

(B) the condensation product of (i) a polycarboxylic acid having the formula n''represents 2 or 3; and, (ii) a $C_9$–$C_{24}$ acyclic alkanol, so that at least one OH group remains on the ester formed. For example esterification of citric acid may result in esterification of only one, or all three COOH groups, and will leave the OH group. As long as one COOH group is esterified, the remaining COOH groups enhance the polarity provided by the OH group.

(C) a mono- or diester of a polyester having a repeating unit of from $C_3$–$C_8$ carbon atoms, including polycaprolactone polyol, or of a polyxether polyol including polytetramethylene glycol, or a polyoxyalkylene diol or triol, produced by transesterification with a $C_9$–$C_{24}$ fatty acid so that at least one OH group remains. For example esterification of PTMEG results in one OH group remaining; esterification of a polyether triol may leave one or two, preferably one one OH group.

(D) an ester of a $C_{10}$–$C_{15}$ polyaralkylene polyester polyol such as recycled polyethyleneterephthalate (PET) polyol available from Chardonol having an OH No. in the range from about 100 to about 300,which polyol is esterified with a $C_9$–$C_{24}$fatty acid so that the terminal OH group remains.

(E) an ester of a polyether diol derived from a polyalka($C_4$–$C_6$)diene diol and a $C_2$–$C_{24}$ fatty acid; or, an ester derived from polyimethylsiloxane diol and a $C_2$–$C_{24}$ fatty acid, each ester having a terminal OH group; and, (F) a polyester polyol such as one having a repeating unit derived from acrylic or methacrylic acid and a polyol selected from the group consisting of a $C_2$–$C_{12}$ alkylene diol, or triol; a polyalkylene $C_2$–$C_4$ diol; or, a polyoxyalkylene $C_2$–$C_4$ diol. For example, esterification of castor oil may leave one or two, preferably two, OH groups.

Most preferred is a compatibilizer having a paraffinic portion $CH_3$-$(C_nH_{2n})$- which is non-polar and strongly attracted to the asphalt. In general, the longer the chain, the higher the attraction to the asphalt, so that with relatively short chain molecules, a greater amount of them will generally be needed to suspend or invert the base material within the liquid prepolymer. Preferred diols and triols which may be esterified with a $C_9$–$C_{24}$ fatty acid are: propylene glycol, 2-methyl-propane diol, diethylene glycol hexylene glycol, 1,5-pentane diol, 1,4-butane diol, polyoxypropylene glycol, butylene glycol, hydroxyethylacrylate diol, neopentyl glycol, dicyclopentadiene diol.

The compatibilizer preferably is present in the range of from 0.01 part to about 5 parts by weight based on 100 parts of blend. Since the choice of an optimal compatibilizer and its concentration typically depends upon the particular prepolymer and asphalt used, such choice can be made, and the concentration determined, using ordinary skill and routine experimentation.

The resulting blend can be easily dispensed, for example in a caulking gun or by pumping the blend. The blend may be cast as a film, sprayed or injection molded. Curing of the blend results in an elastomeric material can be useful as a roofing sealer, highway sealer, automotive undercoat, window mastic, and related applications. The blend is particularly useful as a sealant for porous surfaces which provide high surface area for effective bonding.

The blend of the present invention is preferably stored and transported in its pre-cured state, and dispensed when needed for application before being moisture-cured. Curing can be conventionally initiated depending upon what prepolymer is used in the blend.

To avoid bubbles in the cured elastomer, an absorbent for $CO_2$ (evolved during the cure of a polyurethane prepolymer) such as a molecular sieve, may be added to the blend.

As indicated above, fillers, thixotropic agents and extenders may also be added to tailor the physical properties of the blend. Organoclay fillers comprising platelets having long chain organic compounds bonded to faces thereof, are favored. At rest, the long chain compounds provide a thickening effect, but when a shearing force is applied, such as when the material is stirred, or squeezed from a caulking gun, the viscosity of the blend is reduced. Other additive which may be added include flame retardants, inorganic particulate and fibrous reinforcement, UV stabilizers, blowing agents, perfumants, antistats, insecticides, bacteriostats, fungicides, and the like. As extenders, elastomers which can be included as an ingredient in forming the asphalt material of this invention.

An elastomeric extender may be used provided it forms a single phase with either the asphalt portion or the prepolymer portion. For example, liquid butadiene may be used to extend the asphalt; and, liquid EPDM may be used to extend the prepolymer phase.

A preferred general procedure for forming a blend is as follows: The prepolymer portion is produced in a first batch, and the asphalt portion is produced in a separate batch. The two portions are then blended together. The order of blending is not critical, but typically the prepolymer portion is added to the asphalt portion.

All reference to "parts" herein are to "parts by weight per 100 parts of blend".

The asphalt portion is prepared as follows: 1. The asphalt component is heated in a substantially anhydrous environment until fluidizable under high shear. mixing conditions and such environment is maintained throughout the blending procedure. The amount of asphalt is preferably about 10 to about 80 parts, most preferably from 15 to 60 parts. 2. Plasticizer(s), if necessary, is added to the heated asphalt. The amount of plasticizer is preferably about 2 to about 40 parts, most preferably from 20 to 40 parts. 3. The blocking agent, preferably an anhydride, isocyanate or carbodiimide, is added. The preferred amount of blocking agent is about 0.2 to about 5 parts, most preferably about 0.5 to 1.5 parts. 4. A catalyst is added (preferably tin, imidizole, or other metal catalyst). The preferred amount of catalyst is in the range from about 0.1 part to 2 parts. 5. Mixing with a high speed disperser (3200–7200 revs/min) is continued and desired thickeners, thixotropes, antioxidants and any other additives are added. The preferred amount of additives is from 2 to about 25 parts. 6. The compatibilizer is then added. The preferred amount of compatibilizer is at least 0.1 part, preferably from 0.15 to 1 part.

After thoroughly mixing, the moisture content is checked with a Karl Fischer Coulometer. If the moisture content is higher than 0.02%, a moisture scavenger is added until the moisture content is less than 0.02%.

The prepolymer portion may be used as received if it is a substantially anhydrous polysiloxane prepolymer or an EPDM terpolymer. If not substantially anhydrous, a moisture scavenger is used to remove the water.

If a polyurethane prepolymer portion is to be used in the blend, the prepolymer portion is prepared at slightly elevated temperature (140°–190° F.) under anhydrous conditions as follows: 1. About 20 to about 75 parts, preferably from 40 to 60 parts of a diol or triol having an equivalent weight from 1000 to 10,000; about 2 to 25 parts, preferably 10 to 15 parts plasticizer; about 6 to 40 parts and preferably from 5 to 12 parts of about 150 equivalent weight diisocyanate; and from about 0.02 to 1 part of catalyst (preferably tin) are charged to a mixing zone and mixed into a homogeneous mixture. 2. The polyurethane prepolymer preferably comprises about 30 to 80 parts, more preferably, from 40 to 60 parts of the final material.

The prepolymer portion is typically added to the asphalt portion and high shear mixing, sufficient to provide the microdispersion is continued until the asphalt having the desired particle size, is microdispersed in the continuous "phase. The mixture is pumped into packaging containers, allowed to cool and stored.

In the following examples, all 'parts' referred to, are 'parts by weight' based on 100 parts of blend, unless otherwise specified.

EXAMPLE 1

1. A polyurethane prepolymer is prepared in a closed, substantially water-free vessel, by mixing 34 parts polyoxypropylene glycol triol (2000 equivalent weight); 7 parts butylbenzyl phthalate; 7 parts MDI; and about 0.05 part tin catalyst; at room temperature.

2. An asphalt portion is prepared by mixing 38 parts 200 Pen industrial grade asphalt heated under essentially anhydrous conditions until fluid.

3. About 9 parts butylbenzyl phthalate are added to the heated asphalt, and then 0.6 part of maleic anhydride, with mixing for about 30 minutes until a homogeneous mixture is formed. Dibutyltin diacetate catalyst, about 0.15 part, is then added, and the asphalt mixed for about 2 hr.

4. 1 part of a precipitated silica thixotrope filler and about 4 parts of a calcium carbonate particle filler are then added, and optionally 1 to 5 parts of a butyl rubber extender.

5. 0.2 part of propylene glycol monostearate is then added.

While the asphalt is mixed under high shear, the prepolymer is added and mixed for about 30 minutes until all the desired microdispersion is formed. The blend is allowed to cool and stored in an anhydrous environment. Polyether polyurethane blends obtained as described above have a viscosity (Brookfield HBT spindle #4, @10 rpm at 20° C.) in the range from 40,000–75,000 cps.

The above blend is fairly well cured after 2 hr, and is found to fully cure overnight to a commercially acceptable, elastomer under most commonly encountered outdoor weather conditions. The overnight relative humidity can be as low as about 30% and the overnight temperature can be as low as about 0° F. and the material will properly cure in about 10 to about 20 hours. At higher temperatures and relative humidities, the material will cure more quickly.

The amount of cure time can be adjusted by increasing or decreasing the amount of tin catalyst in the formulation, or, by adding an oxazolidine or ketimine in an amount of about 1 to about 5 parts.

Upon curing, the resulting product of Example 1 had excellent peel adhesion, tensile adhesion and lap shear. The material was durable, water- and weather-resistant, and is useful as an adhesive in roofing applications.

EXAMPLE 2

A mastic compound such as is used for flashing a roof, is prepared with a polyurethane prepolymer portion made with the following ingredients:

| Polyoxypropylene glycol (polyether triol) 6200 MW | 100 |
| Modified MDI (eq. wt. 143) | 18 |
| Butylbenzyl phthalate | 15 |
| Dibutyl tin dilaurate | 0.06 |

The asphalt portion is prepared with the following ingredients:

| Butylbenzyl phthalate | 25 |
| Antioxidant | 0.2 |
| Maleic anhydride | 0.9 |
| 200 Pen Asphalt | 60 |
| Dibutyl tin diacetate | 0.15 |

The asphalt portion is heated to 200° F., mixed for 1 hr., and the moisture checked. Add p-toluene-sulfonyl isocyanate ("PTSI") for moisture scavenging if moisture is over 0.02%. The following ingredients (parts) are added as extender and filler, respectively:

| Polyisobutylene rubber | 4 |
| Acetylene carbon black | 10 |

The rubber and carbon black are mixed for 10 minutes into the asphalt portion, then blended 50/50 with the prepolymer at a high shear rate until a smooth mixture is formed. The particle size is measured with a UV fluorescence microscope (made by Olympus), which has a built-in grid which allows one to compare the size of images seen through the microscope with a standard 2 mm slide divided into increments of 0.02 mm. When a drop of blend is irradiated with UV light, the prepolymer phase fluoresces showing the asphalt particles as dark spots, more than 80% of which are found to measure less than 40 μm. For a stable dispersion, it is sufficient to have more than 50% of the asphalt particles smaller than 40 μm.

EXAMPLE 3

A moisture-cure blend is made for use as a "hot-melt" (to be dispensed from a "hot-melt gun") by microdipersing an asphalt portion into a polyurethane prepolymer portion, the latter being made from an aromatic polyester with the following ingredients listed in the amounts used, as 'parts':

| | |
|---|---|
| Poly(1,4-butanediol/neopentyl glycol adipate) 3200 MW | 100 |
| 4,4-methylene-bis-phenyl diisocyanate | 20 |
| Dibutyl tin dilaurate | 0.08 |

The asphalt portion for the hot-melt moisture cure urethane is produced by mixing the following (in parts):

| | |
|---|---|
| 200 Pen Asphalt | 100 |
| Antioxidant | 0.4 |
| Maleic anhydride | 1.5 |
| Dibutyl tin diacetate | 0.1 |
| Polyisobutylene | 3.0 |
| Acetylene carbon black | 5.0 |
| 1,4-butane glycol monostearate | 0.5 |

The ingredients are heated and mixed for 1 hour at 200° F., and checked for moisture, scavenging with PTSI if found to be above 0.02%. When anhydrous, the prepolymer portion is combined with the asphalt blend in a 50/50 ratio. After mixing for 1 hr at high shear until the particle size more than 50% of the asphalt particles are in the size range from 1 μm to 20 μm. The prepolymer is seen to be the continuous phase under UV fluorescence in a microscope (125×).

EXAMPLE 4

In a manner analogous to that described in example 2 hereinabove, a blend of a diol of a copolymer of butadiene and acrylonitrile (Hycar$^R$1300X34 available from BFGoodrich Company) is used to prepare a solvent-free polyurethane prepolymer portion which is blended with an asphalt portion.

| Ingredient | Parts of each Ingredient |
|---|---|
| Hycar 1300X34 | 400 |
| Butylbenzyl phthalate | 150 |
| Isophorone diisocyanate | 65 |
| Dibutyl tin dilaurate | 0.4 |

Add Hycar 1300 and butylbenzyl phthalate to a clean dry reactor. Heat to 130° F. while mixing under a blanket of dry nitrogen, and check the moisture content using a Carl Fischer Coulometric titrator. If the moisture is over 0.03% add PTSI (p-toluene sulfonyl isocyanate) and recheck moisture until it is below 0.03%. When sufficiently dry, add the isophorone diisocyanate, mix 5 min then add dibutyl tin dilaurate. After an exotherm which raises the temperature of the mixture about 20° F., the polyurethane prepolymer portion is ready for use. The terminal OH groups of the Hycar diene-acrylonitrile polyol react with isocyanate groups to form urethane linkages. The prepolymer has a backbone of the copolymer with aliphatic isocyanate end caps which are crosslinked through a urea linkage (RNHCONHR) upon exposure to moisture.

It is found that using the prepolymer and asphalt portions for the blend in preferred ranges of viscosity, facilitates the generation of the desired microdispersion of asphalt particles in the size range found essential to maintain a stable dispersion. The ranges of viscosity (Brookfield HBT spindle #4, @10 rpm at 20° C.) for the prepolymer and asphalt portions are set forth herebelow:

| | |
|---|---|
| Acrylic prepolymer | 80–100,000 cps |
| Asphalt portion used with above | 50–80,000 cps |

This asphalt portion for the hot-melt moisture-cure urethane is produced by mixing the following (in parts):

| Ingredients | Parts |
|---|---|
| Butylbenzyl phthalate | 28.09 |
| Antioxidant | 0.2 |
| Maleic anhydride | 0.84 |
| Dioctyl azelate | 5. |
| 200 Pen asphalt | 56. |
| Propylene glycol monostearate | 0.22 |
| Diethyl malonate | 0.99 |
| Acetylene Carbon Black | 7.72 |
| Dibutyl Tin Diacetate | 0.15 |
| Oxazolidine | 0.75 |
| PTSI (p-toluene sulfonyl isocyanate) | as needed |

Combine the hot asphalt, butylbenzyl phthalate, antioxidant, maleic anhydride, and dioctyl azelate, and mix under sufficient agitation for 1 hour at 150° to 200° F. to form a homogeneous mixture. Add propylene glycol monostearate, diethyl malonate acetylene black, and dibutyl tin diacetate. Check moisture using a Karl Fischer Coulometric titrator, and scavenge with PTSI if needed, then recheck until moisture content is less than 0.02%. When the moisture is below 0.02% add the oxazolidine.

Acrylic-urethane prepolymer blends obtained as described, have a viscosity (Brookfield HBT spindle #4, @10 rpm at 20° C.) in the range from 50–80,000 cps.

The ratios of polyurethane prepolymer to the asphalt portion in the blend may be 60/40; or 50/50; or 33/66. In all the blends, continued mixing at high shear rate in a high speed disperser (HSD or Meyers) mixer, over a period of from 30 min to 1 hr, results in the asphalt portion being the microdispersed phase in the prepolymer phase. Shorter mixing times are realized with a homogenizing mixing head. The mixing temperature is preferably in the range from 150°–190° F. The particle size is checked by UV fluorescence under a microscope which provides visual evidence of a dispersion of asphalt particles, about 90% of which are smaller than 100 μm. The blend so formed, is stored in a dry, air-tight, nitrogen-blanketed container until needed.

EXAMPLE 5

In a manner analogous to that described in example 4 hereinabove, a mixture of a polyether triol and recycled PET polyol is used to prepare a solvent-free polyurethane prepolymer portion which is blended with an asphalt portion.

| Ingredient | Parts |
|---|---|
| Butylbenzyl Phthalate | 100 |
| Polyether Triol (6200 MW) | 425 |
| Recycled PET polyol (OH #185) | 75 |
| PTSI (p-toluene sulfonyl isocyanate) | 4 |
| Modified MDI | 180 |
| Dibutyl tin dilaurate | 0.3 |

Mix the butylbenzyl phthalate, polyols and heat to 120° F. Check moisture with Karl Fischer Coulometer, and when below 0.02% add the MDI and mix for 5 minutes, then add the tin catalyst. The exotherm is about 25°–30° F. The HBT Brookfield viscosity (spindle #4 @10 rpm at 20° C.) is about 27,200 cps. The preferred viscosity range for the PET prepolymer portion is 20–40,000 cps.

The asphalt portion for the hot-melt moisture cure urethane is produced by mixing the following (in parts):

| Ingredients | Parts |
| --- | --- |
| Butylbenzyl Phthalate | 125. |
| Antioxidant | 0.9 |
| Maleic anhydride | 3.75 |
| Dioctyl azelate | 24.75 |
| 200 Pen Asphalt | 250. |
| Dibutyl tin diacetate | 0.09 |
| Propylene glycol monostearate | 0.425 |
| Thixotropic clay (amine treated) | 14.8 |

The butylbenzyl phthalate, dioctyl azelate, antioxidant maleic anhydride, and 200 pen asphalt are mixed at a medium to high speed for 1 hour at a temperature of 150°–200° F. The remaining ingredients are then added and mixed 15 minutes. The moisture content is maintained below 0.02% by addition of PTSI as needed, until anhydrous. The asphalt blend has a viscosity of about 56,000 cps (measured as before).

The polyurethane prepolymer portion and the asphalt portions are blended with zinc stearate in the following amounts (total parts used):

| Polyurethane prepolymer portion | 150 |
| --- | --- |
| Asphalt portion | 350 |
| Zinc Stearate | 15 |

This blend produced a microdispersion of asphalt particles from 1–10 μm in diameter in the continuous prepolymer phase, as seen through a UV fluorescence microscope. Lap shear values were 78 lbs/in² for cohesive failure on a modified bitumen membrane pulled at 2″ per minute. The blend obtained has a viscosity over 100,000 cps.

EXAMPLE 6

In a manner analogous to that described in example 3 hereinabove, 2-methyl-propane ("MP") diol adipate is used to prepare a solvent-free polyurethane prepolymer portion which is blended with an asphalt portion. "Parts" are parts by weight to make the total weight (more than 100 parts) of the blend.

| Ingredient | Parts |
| --- | --- |
| MP diol-adipate polyol (OH #29.9) | 750 |
| Butylbenzyl phthalate | 150 |
| Isophorone diisocyanate | 125 |
| PTSI (p-toluene sulfonyl isocyanate) | as needed |
| Dibutyl tin dilaurate | 0.37 |

Heat the polyol to 130° F., check moisture content so that it is no more than 0.02% maximum; add PTSI as needed. When substantially anhydrous, add the isophorone diisocyanate. Mix 5 min then add the tin catalyst. Keep dry, under a nitrogen blanket while mixing and for storage.

The asphalt portion for the hot-melt moisture cure urethane is produced by mixing the following (in parts):

| Ingredient | Parts |
| --- | --- |
| Butylbenzyl Phthalate | 28. |
| Antioxidant | 0.2 |
| Maleic Anhydride | 0.841 |
| Dioctyl azelate | 5. |
| 200 Pen Asphalt | 56. |
| Propylene Glycol Monostearate | 0.221 |
| Diethyl Malonate | 0.9 |
| Acetylene Black | 7. |
| Dibutyl Tin Diacetate | 0.69 |
| Silane Adhesion Promotor | 0.1 |
| Oxazolidine | 3. |

Mix the first 5 ingredients listed for 1 hr at 150°–200° F., then add propylene glycol monostearate, diethyl malonate, acetylene black, and the dibutyl tin diacetate. Check the moisture content after mixing 15 min and scavenge with PTSI until less than 0.02%. Then add the silane adhesion promoter and the oxazolidine.

The polyurethane prepolymer and asphalt portions are mixed in a 50/50 blend for 80 min at a high shear rate at 150° F. The stable dispersion produced had microdispersed asphalt particles the majority of which were smaller than 5 μm. Upon curing the blend excellent tensile and elongation properties are obtained.

This blend is particularly suitable for a weather resistant coating, adhesive or mastic/caulk.

EXAMPLE 7

In a manner analogous to that described in example 4 hereinabove, a liquid EPDM is used to prepare a solvent-free EPDM prepolymer portion which is blended with an asphalt portion. The 2-methyl-propane-diol stearate compatibilizer used, was made by trans-esterifying 2 methyl propane diol (one mole) with stearic acid (one mole) using methane sulfonic acid as a catalyst. "Parts" are parts by weight to make the total weight (more than 100 parts) of the blend.

| Ingredient | Parts |
| --- | --- |
| Liquid EPDM (6000–8000 MW) 10% Dicyclopentadiene | 150. |
| MP-Diol stearate compatibilizer | 5. |
| 1090N50E Asphalt Blend | 200. |
| Silane adhesion promotor | 1.5 |
| Low Molecular Weight Butyl Rubber | 10. |
| Cobalt napthenate | 0.4 |
| t-butyl hydroperoxide | 16. |
| Trimethylol propane triacrylate (TMPTA) | 10. |

Mix the EPDM, compatibilizer, butyl rubber, silane, cobalt naphthenate, and asphalt blend under high shear, at a temperature in the range from 180°–200° F., and visually check the size of the microdispersed asphalt particles. After 1 hr the majority are less than 10 μm in diameter; continue mixing if more than about 25% are greater than about 50 μm and recheck under the UV microscope. Add the TMPTA, mix 5 min, then add the t-butyl hydroperoxide slowly under a nitrogen blanket. EPDM blends obtained as described herein have a HBT Brookfield viscosity (spindle #4 @10 rpm at 20° C.) in the range from 120,000–150,000 cps.

The blend provides an excellent affordable, highly weatherable coating. The Weather-0-Meter sample exposed to a Xenon arc light for 4,000 hours showed no cracking and only minor caulking.

EXAMPLE 8

In a manner analogous to that described in example 3 hereinabove, a liquid poly(dimethylsiloxane) prepolymer is used to prepare a solvent-free silicone prepolymer portion which is blended with an asphalt portion. The silicone compatibilizer was made by trans-esterifying 1 mole of a silicone diol with i mole of stearic acid using methane sulfonic acid as a catalyst. "Parts" are parts by weight to make the total weight (more than 100 parts) of the blend.

| Ingredient | Parts |
| --- | --- |
| Maleic anhydride | 0.84 |
| 200 Pen asphalt | 56. |
| PTSI (p-toluene sulfonyl isocyanate) | as needed |
| 1352N2E Silicone Compatibilizer | 0.75 |
| Acetylene Black | 4. |
| Polydimethyl siloxane | 50. |
| Aminosilane crosslinking catalyst* | 5. |

*Sec-butylamino and cyclohexyl amine silane

Keep dry by mixing while under a nitrogen blanket. Heat and mix the asphalt and maleic anhydride for 1 hr at 180°-200° F. Check moisture content, and if over 0.02% add PTSI and retest. When dry add compatibilizer and mix for 5 min, then add silicone polymer. Add carbon black after 15 min mixing, then mix for 15 more min. Add silane crosslinker last and protect from moisture; mix for 15 min. The silicone blend obtained has a HBT Brookfield viscosity (spindle #4@10 rpm at 20° C.) of 150,000 cps.

Having thus provided a general discussion, described the stable dispersion produced, and the overall process for preparing the dispersion, in detail, and having illustrated the invention with specific examples of the best mode of carrying it out, it will be evident that the invention has provided an effective solution to a problem which has never been satisfactorily solved by another. It is expected that a compatibilizer having substantially the same general physicochemical interaction with a polysulfide prepolymer and a bituminous material may be used to produce a stable microdispersion of asphalt in the polysulfide continuous phase. It is therefore to be understood that no undue restrictions are to be imposed by reason of the specific embodiments illustrated and discussed, except as provided by the following claims.

I claim:

1. A substantially solvent-free lend comprising a substantially anhydrous, stable, moisture-curable dispersion of bitumen or asphalt microdispersed as a dispersed phase within a continuous phase of a liquid prepolymer, said dispersed phase consisting of particles in the size range from 0.5 μm to 100 μm having essentially no functional groups reactive with a functional group of said liquid prepolymer selected from the group consisting of a polyurethane, a terpolymer of ethylene-propylene-diene and a silicone, said dispersed phase being maintained by a compatibilizer having opposed substantially polar and non-polar terminal portions, said compatibilizer being present in an amount in the range from 0.01 to 5 parts per 100 parts of said blend and selected from the group consisting of (A) an ester of
  (i) a polyol having the formula $R^1(OH)_{n'}$ wherein $R^1$ represents $C_2$–$C_{12}$ branches or straight chain hydrocarbyl, and
  n' is an integer in the range form 2 to 4; and,
  (ii) a $C_9$–$C_{24}$ fatty acid,
  so that at least one OH group remains on the ester formed;
(B) an ester of (i) a polycarboxylic acid having the formula $R^2(COOH)_{n''}$ wherein $R^2$ represents $C_4$–$c_6$; and, n" represents 2 or 3; and,
  (ii) a $C_9$–$c_{24}$ acyclic alkanol;
  so that at least one OH group remains on said ester;
(C) a mono- or diester of a polyether polyol having a repeating unit of from $C_3$–$C_8$ carbon atoms, and, a $C_9$–$C_{24}$ fatty acid;
(D) an ester of a polyester polyol and a $C_9$–$C_{24}$ alkanol, said ester having at least one OH group remaining in a terminal portion thereof;
(E) an ester of a polyether diol and a $C_2$–$C_{24}$ fatty acid, said polyol being selected from the group consisting of a polyalka($C_5$–$C_6$) diene diol and, a polydimethylsiloxane diol; and,
(F) an ester of a polyester polyol having a repeating unit derived from acrylic acid and a polyol selected from the group consisting of a $C_2$–$C_{12}$ alkylene diol, or triol; a polyalkylene $C_2$–$C_4$ diol; and a polyoxyalkylene $C_2$–$C_4$ diol.

2. The blend of claim 1 wherein
said $R^1$ in said polyol is a $C_2$–$c_{12}$ straight chain, and n' is 2;
in said (C), said polyester polyol is polycaprolactone, said polyether polyol is selected from the group consisting of polytetramethylene glycol, and a polyoxyalkylene diol or triol;
in said (D), said ester is of a $C_{10}$–$C_{15}$ polyaralkylene including a recycled polyethyleneterephthalate polyol having an OH No. in the range from about 100 to about 300.

3. The blend of claim 1 wherein said polyol in (A) is selected from the group consisting of propylene glycol, 2-methyl-propane diol and neopentyl glycol.

4. The blend of claim 1 wherein in said (B), said polycarboxylic acid is citric acid, and said alkanol is dodecanol.

5. The blend of claim 1 wherein in said (C), said polyester polyol is caprolactone polyol, said polyether polyol is selected from the group consisting of polyoxypropylene diol and polyoxyalkylene glycol, and said fatty acid is selected from the group consisting of lauric acid, oleic acid, pelargonic acid and stearic acid.

6. The blend of claim 1 wherein in said (D), said ester of a polyester polyol is polyethyleneterephthalate polyol and said alkanol is dodecanol.

7. The blend of claim 1 wherein said asphalt is derived from (a) residues produced by atmospheric and vacuum distillation of crude petroleum; (b) oxidation of air blowing of asphalts derived from the residues produced in (a); (c) deasphalting of petroleum residues of lubricating oils of asphalt origin; and, (d) blending hard propane asphalts from (b) with resins and oils to produce the so-called "reconstituted asphalts".

8. The blend of claim 7 wherein said asphalt is reacted with a blocking agent present in an amount in the range from 0.1 to 5 parts by weight per 100 parts of said blend.

9. The blend of claim 8 wherein said liquid prepolymer is present in an amount in the range from 25-75 parts by weight per 100 parts of said blend.

10. The blend of claim 8 wherein said blend includes an elastomeric extender forming a single phase with said asphalt.

11. The blend of claim 10 wherein said elastomeric extender is butadiene.

12. The blend of claim 8 wherein said blend includes an elastomeric extender forming a single phase with said liquid prepolymer.

13. The blend of claim 12 wherein said elastomeric extender is a terpolymer of ethylene-propylene-diene.

14. A liquid, moisture-curable, polyurethanemodified blend of bitumen or asphalt, comprising,
   (a) a polyether and/or polyester urethane prepolymer,
   (b) a bitumen or asphalt microdispersed as a dispersed phase within a continuous phase of said prepolymer, said dispersed phase consisting of particles in the size range from 0.5 μm to 100 mμm having essentially no functional groups reactive with a functional group of said prepolymer, and,
   (c) a compatibilizer present in an amount in the range form 0.01 to 5 parts per 100 parts of said blend, said compatibilizer selected from the group consisting of
   (A) an ester of
   (i) a polyol having the formula $R^1(OH)_{n'}$ 

wherein $R^1$ represents $C_2$-$C_{12}$ branched or straight chain hydrocarbyl, and
   n' is an integer in the range from 2 to 4; and,
   (ii) a $C_9$-$C_{24}$ fatty acid,
   so that at lest one OH group remains on the ester formed; (B) an ester of (i) a polycarboxylic acid having the formula $R^2(COOH)_{n''}$ 
   wherein $R^2$ represents $C_4$-$C_6$; and, n'' represents 2 or 3; and,
   (ii) a $C_9$-$C_{24}$ acyclic alkanol; so that at least one OH group remains on said ester;
   (C) a mono- or diester of a polyester polyol having a repeating unit of from $C_3$-$C_8$ carbon atoms, or of a polyether polyol and, a $C_9$-$C_{24}$ fatty acid;
   (D) an ester of a polyester polyol and a $C_9$-$C_{24}$ fatty acid, said ester of said polyester polyol having at least one OH group remaining in a terminal portion thereof;
   (E) an ester of a polyether diol and a $C_2$-$C_{24}$ fatty acid, said diol being selected from the group consisting of a polyalka($C_5$-$C_6$) diene diol and, a polydimethylsiloxane diol; and,
   (F) an ester of a polyester polyol having a repeating unit derived from acrylic acid and a polyol selected from the group consisting of a $C_2$-$C_{12}$ alkylene diol, or triol; a polyalkylene $C_2$-$C_4$ diol; and a polyoxyalkylene $C_2$-$C_4$ diol.

15. The blend of claim 14 wherein, said prepolymer is present in an amount in the range from 25-75 parts by weight per 100 parts of said blend; said asphalt is derived from residues produced by atmospheric and vacuum distillation of crude petroleum; said asphalt is reacted with a blocking agent present in an amount in the range from 0.1 to 5 parts by weight per 100 parts of said blend; said polyol in (A) is selected from the group consisting of propylene glycol, 2-methyl-propane diol and neopentyl glycol; and, said $C_9$-$C_{24}$ fatty acid is selected from the group consisting of lauric acid, oleic acid, pelargonic acid and stearic acid.

16. A method of preparing a blend of bitumen or asphalt and a liquid prepolymer, comprising, charging said liquid prepolymer and said bitumen or asphalt having essentially no functional groups reactive with a functional group on said prepolymer, to a substantially moisturefree mixing zone; subjecting said butumen or asphalt and said liquid prepolymer to mixing in the presence of sufficient compatibilizer to maintain a stable microdispersion of said butumen or asphalt in said prepolymer which forms the continuous phase, said mixing being effected with enough energy to disperse said butumen or asphalt as a microdispersed phase of particles in the size range from 0.5 μm to 100 μm, whereby said particles as a dispersed phase remain in said size range in a substantially anhydrous, moisture-curable blend for at least 30 days when stored at a temperature in the range from −20° C. to 100° C.

17. The method of claim 16 wherein said liquid prepolymer is selected from the group consisting of a polyurethane, a terpolymer of ethylene-propylene-diene and a silicone.

18. The method of claim 17 wherein said compatibilizer is present in an amount in the range from 0.01 to 5 parts per 100 parts of said blend, and is selected form the group consisting of
   (A) an ester of
   (i) a polyol having the formula $R^1(OH)_{n'}$ 

wherein $R^1$ represents $C_2$-$C_{12}$ branched or straight chain hydrocarbyl, and
   n' is an integer in the range from 2 to 4; and,
   (ii) a $C_9$-$c_{24}$ fatty acid, so that at least one OH group remains on the ester formed;
   (B) an ester of (i) a polycarboxylic acid having the formula $R^2(COOH)_{n''}$ 
   wherein $R^2$ represents $C_4$-$C_6$; and, n'' represents 2 or 3;and,
   (ii) a $C_9$-$C_{24}$ acyclic alkanol;
   so that a least one OH group remains on said ester;
   (c) a mono- or diester of a polyester polyol having a repeating unit of from $C_3$-$C_8$ carbon atoms, or of a polyether polyol and, a $C_9$-$C_{24}$ fatty acid;
   (D) an ester of a polyester polyol and a $C_9$-$C_{24}$ fatty acid, said ester of said polyester polyol having at least one OH group remaining in a terminal portion thereof;
   (E) an ester of a polyether diol and a $C_2$-$C_{24}$ fatty acid, said diol being selected form the group consisting of a polyalka($C_5$-$C_6$)diene diol and, a polydimethylsiloxane diol; and,
   (F) an ester of a polyester polyol having a repeating unit derived from acrylic acid and a polyol selected from the group consisting of a $C_2$-$C_{12}$ alkylene diol, or triol; a polyalkylene $C_2$-$C_4$ diol; and a polyoxyalkylene $C_2$-$C_4$ diol.

19. The method of claim 18 wherein, said prepolymer is present in an amount in the range from 25-75 parts by weight per 100 parts of said bend; said asphalt is derived from residues produced by atmospheric and vacuum distillation of crude petroleum; said asphalt is reacted with a blocking agent present in an amount in the range from 0.1 to 5 parts by weight per 100 parts of said blend; and, said polyol in (A) is selected from the group consisting of propylene glycol, 2-methyl-propane diol and neopentyl glycol; and, said $C_9$–$C_{24}$ fatty acid is selected from the group consisting of lauric acid, oleic acid, pelargonic acid and stearic acid.

* * * * *